(No Model.)

L. F. ROBARE.
SCALE ATTACHMENT.

No. 482,138. Patented Sept. 6, 1892.

WITNESSES:
F. McArdle,
C. Sedgwick

INVENTOR:
L. F. Robare
BY Munn & Co.
ATTORNEYS

UNITED STATES PATENT OFFICE.

LOUIS F. ROBARE, OF AU SABLE FORKS, ASSIGNOR TO HIMSELF, AND ROBERT J. CLARK, OF CHAMPLAIN, NEW YORK.

SCALE ATTACHMENT.

SPECIFICATION forming part of Letters Patent No. 482,138, dated September 6, 1892.

Application filed January 20, 1892. Serial No. 418,633. (No model.)

*To all whom it may concern:*

Be it known that I, LOUIS F. ROBARE, of Au Sable Forks, in the county of Essex and State of New York, have invented a new and Improved Scale Attachment, of which the following is a full, clear, and exact description.

The object of the invention is to provide a new and improved scale attachment which is simple and durable in construction and designed to render the beam noiseless at the fork.

The invention consists of contacts made of soft material and arranged at the contacting points of the scale-beam with the fork.

The invention also consists of certain parts and details and combinations of the same, which will be fully described hereinafter, and then pointed out in the claims.

Reference is to be had to the accompanying drawings, forming a part of this specification, in which similar letters of reference indicate corresponding parts in both the figures.

Figure 1:
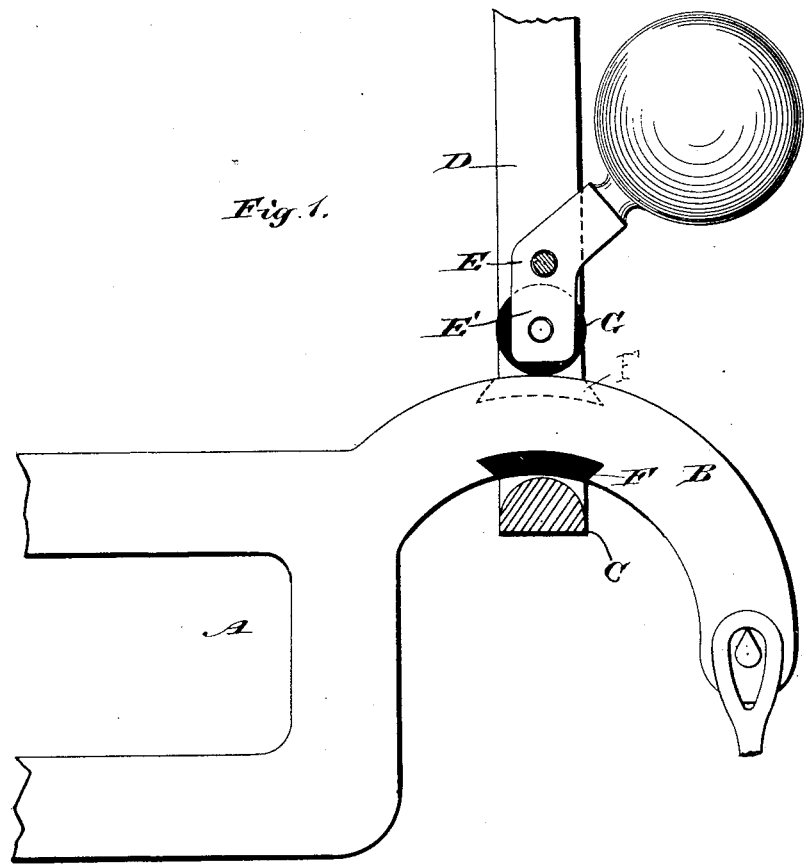
Figure 2:
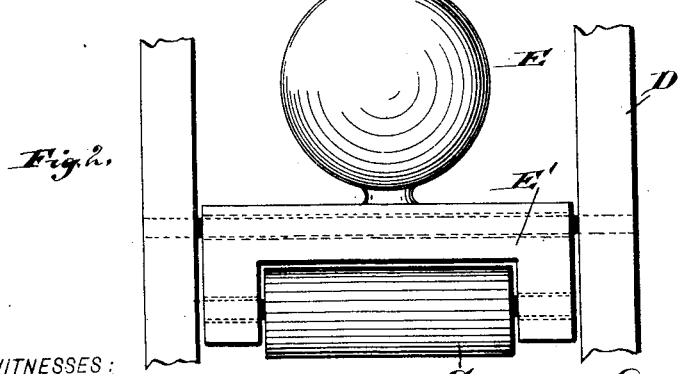

Figure 1 is a side elevation of the improvement as applied and with parts in section. Fig. 2 is an end view of the locking device pivoted in the fork.

The improvement is more especially designed for use on large scales in which the platform is exposed and the weighing end of the beam extends into an office. In scales of this class and as now constructed the weighing end of the beam swings between two points in the fork, so that in case a person or dog or other animal passes over the platform the beam strikes, alternately, the two points of the fork, thus producing a rattling noise, to the great discomfort of the occupant of the office. By the device presently to be described the above-mentioned defect is completely overcome.

The scale-beam A is of the usual construction and swings at its front end B between the cross-bar C of the fork D and the usual locking-lever E, pivoted in the said fork above the beam end B. On the under side of the end B is secured a contact F, made of rubber or other soft material, so that when the beam end B swings downward the said contact F strikes the cross-bar C, thus deadening the noise which would otherwise occur. The locking-lever E is formed with a fork E', in which is journaled a roller G, also made of rubber or other suitable material and adapted to engage the top of the beam end B, so that when the beam swings upward the noise is deadened when the beam end comes in contact with the roller G.

It will be seen that when the locking-lever E is in the position shown in Fig. 1 and a person or animal passes over the platform no noise is produced at the beam end B, as the contacting points of the beam end B with the cross-bar C and the locking-lever E are of soft material and prevent noise.

Instead of the roller G the locking-lever E may be of the usual construction, and in this case a contact-point F is also secured in the top of the end B, as indicated in dotted lines in Fig. 1.

By thus introducing a soft material between the contacting points of the beam end of the fork the scale is rendered noiseless at that point.

Having thus described my invention, I claim as new and desire to secure by Letters Patent—

1. In a scale attachment, the combination, with a fork, of a scale-beam projecting through the fork and a locking-lever pivoted in the fork and having a roller, of rubber or analogous material, journaled therein, said roller being adapted to engage the top of the beam, substantially as described.

2. In a scale attachment, the combination, with a fork, of a scale-beam projecting through the fork and provided with a contact of soft material on its under side and a locking-lever pivoted in the fork and having a roller of rubber, or analogous material, journaled therein, substantially as herein shown and described.

LOUIS F. ROBARE.

Witnesses:
 JAMES ROGERS,
 JOHN A. SMITH.